US008885312B2

(12) United States Patent
Sumi et al.

(10) Patent No.: US 8,885,312 B2
(45) Date of Patent: Nov. 11, 2014

(54) ESD PROTECTION DEVICE AND MANUFACTURING METHOD THEREOF

(75) Inventors: Takahiro Sumi, Nagaokakyo (JP); Takahiro Kitadume, Nagaokakyo (JP); Jun Adachi, Nagaokakyo (JP); Takayuki Tsukizawa, Nagaokakyo (JP); Masanori Okamoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 107 days.

(21) Appl. No.: 13/367,399

(22) Filed: Feb. 7, 2012

(65) Prior Publication Data

US 2012/0134059 A1 May 31, 2012

Related U.S. Application Data

(63) Continuation of application No. PCT/JP2010/064227, filed on Aug. 24, 2010.

(30) Foreign Application Priority Data

Aug. 27, 2009 (JP) ................................ 2009-196361

(51) Int. Cl.

*H02H 7/20* (2006.01)
*H01C 7/00* (2006.01)
*H01T 4/10* (2006.01)
*H01C 1/148* (2006.01)
*H01C 17/02* (2006.01)
*H01C 1/028* (2006.01)
*H01C 7/10* (2006.01)

(52) U.S. Cl.

CPC *H01T 4/10* (2013.01); *H01C 7/003* (2013.01); *H01C 1/148* (2013.01); *H01C 17/02* (2013.01); *H01C 1/028* (2013.01); *H01C 7/1006* (2013.01)
USPC ................................ 361/112; 361/56; 338/21

(58) Field of Classification Search

CPC ......... H01L 27/0248; H01C 7/12; H02H 9/04
USPC .................................................. 257/355–360
See application file for complete search history.

(56) References Cited

U.S. PATENT DOCUMENTS 5,871,840 A 2/1999 Asada et al.
8,345,404 B2 * 1/2013 Nozoe et al. .................. 361/220

(Continued)

FOREIGN PATENT DOCUMENTS

EP 2 061 123 A1 5/2009
JP 11-097759 * 9/1997

(Continued)

OTHER PUBLICATIONS

Hiehata et al., "ESD Protection Device and Manufacturing Method therefor," U.S. Appl. No. 13/407,790, filed Feb. 29, 2012.

(Continued)

*Primary Examiner* — Jared Fureman
*Assistant Examiner* — Terrence Willoughby
(74) *Attorney, Agent, or Firm* — Keating & Bennett, LLP

(57) ABSTRACT

An ESD protection device includes a ceramic base material, a pair of opposed electrodes provided on a surface of or in the ceramic base material, and a discharge auxiliary electrode film arranged to connect the pair of opposed electrodes, wherein the discharge auxiliary electrode film is composed of a material containing, as its main constituents, metallic particles and glass covering the metallic particles. The discharge auxiliary electrode film is formed by providing an electrode paste containing glass-coated metallic particles that have an approximately 15% rate of increase in weight at about 400° C. for about 2 hours in air, a resin binder, and a solvent so as to connect the pair of opposed electrodes to each other, and then firing at a temperature of about 600° C. or more, higher than a softening point of glass of the glass-coated metallic particles, and not +200° C. higher than the softening point.

20 Claims, 5 Drawing Sheets

(56) References Cited

U.S. PATENT DOCUMENTS

| | | | | |
|---|---|---|---|---|
| 2009/0027157 | A1 * | 1/2009 | Katsumura et al. | 338/21 |
| 2009/0067113 | A1 | 3/2009 | Urakawa | |

FOREIGN PATENT DOCUMENTS

| | | | |
|---|---|---|---|
| JP | 10-330802 | A | 12/1998 |
| JP | 2002-298643 | A | 10/2002 |
| JP | 2004-014437 | A | 1/2004 |
| JP | 2004-014466 | A | 1/2004 |
| JP | 2004-149817 | A | 5/2004 |
| JP | 2007-081012 | A | 3/2007 |
| JP | 2007-265713 | A | 10/2007 |
| JP | 2007-266479 | A | 10/2007 |
| JP | 2008-101276 | A | 5/2008 |
| JP | 2009-152348 | A | 7/2009 |

OTHER PUBLICATIONS

Official Communication issued in International Patent Application No. PCT/JP2010/064227, mailed on Nov. 16, 2010.

* cited by examiner

ESD PROTECTION DEVICE AND MANUFACTURING METHOD THEREOF

BACKGROUND OF THE INVENTION

1. Field of the Invention

The present invention relates to an ESD protection device for protecting a semiconductor apparatus or other suitable apparatus, etc. from electrostatic discharge failures, and more particularly, relates to an ESD protection device including at least a pair of opposed electrodes arranged to oppose each other on a ceramic base material, and a discharge auxiliary electrode film arranged to cover the opposed electrodes partially and cover a space between the opposed electrodes.

2. Description of the Related Art

In recent years, for the use of commercial-off-the-shelf appliances, there has been a tendency to increase the frequency of inserting and removing cables as input-output interfaces, and static electricity is likely to be applied to input-output connector areas. In addition, miniaturization in design rule with increases in signal frequency has made it difficult to create paths, and LSI itself has been very sensitive to static electricity.

Therefore, ESD protection devices have been used widely for protecting semiconductor apparatuses such as LSI and other apparatuses from electrostatic discharge (ESD).

As this type of ESD protection device, a component for countermeasure against static electricity has been proposed which includes at least two opposed electrodes 52*a* and 52*b* arranged so as to be opposed to each other on a ceramic base material 51, and a static electricity protective material layer 53 arranged so as to cover the opposed electrodes 52*a* and 52*b* partially and cover the space between the opposed electrodes, as shown in FIG. 10 (see Japanese Patent Application Laid-Open No. 2007-265713). It is to be noted that in this component for providing a countermeasure against static electricity, the static electricity protective material layer 53 is formed by using a static electricity protective material paste including at least metallic particles with a passive layer formed on the surfaces thereof and a resin, which is prepared by kneading the metallic particles and the resin.

In addition, the component for providing a countermeasure against static electricity in FIG. 10 further includes an intermediate layer 54 and a protective layer 55.

Incidentally, in the case of the component for providing a countermeasure against static electricity in Japanese Patent Application Laid-Open No. 2007-265713, the static electricity protective material layer includes the resin therein. Thus, the component has a limitation (critical PVC) in the ratio of the metallic particles in the static electricity protective material layer, and has a limitation in its ability to lower the discharge starting voltage or the lowering of the peak voltage.

In addition, the resin used for isolating the metallic particles from each other essentially does not have necessarily sufficient heat resistance and oxidation resistance. Thus, there is a problem that the resin is degraded thus causing performance degradation when static electricity is applied repeatedly.

SUMMARY OF THE INVENTION

In view of the circumstances described above, preferred embodiments of the present invention provide an ESD protection device which is able to lower the discharge starting voltage and the peak voltage, and undergoes no characteristic degradation even when static electricity is applied repeatedly.

An ESD protection device according to a preferred embodiment of the present invention includes a ceramic base material; a pair of opposed electrodes including ends opposed to each other at a predetermined distance on a surface of or in the ceramic base material; and a discharge auxiliary electrode film arranged to connect the pair of opposed electrodes, wherein the discharge auxiliary electrode film contains, as its main constituents, metallic particles and glass covering the metallic particles.

In addition, an ESD protection device according to a preferred embodiment of the present invention includes a pair of opposed electrodes including ends opposed to each other at a predetermined distance on a surface of a ceramic base material; and a discharge auxiliary electrode film arranged continuously so as to cover each of the pair of opposed electrodes partially, and cover a region located at a surface of the ceramic base material and between the pair of opposed electrodes, wherein the discharge auxiliary electrode film contains, as its main constituents, metallic particles and glass covering the metallic particles.

Furthermore, an ESD protection device according to a preferred embodiment of the present invention includes a pair of opposed electrodes including ends opposed to each other at a predetermined distance in a ceramic base material; and a discharge auxiliary electrode film arranged in the ceramic base material so as connect the pair of opposed electrodes, wherein a cavity section is provided in the ceramic base material, the pair of opposed electrodes include a first region located where the ends are opposed to each other and provided on the ceramic base material facing the cavity section, and the discharge auxiliary electrode film contains, as its main constituents, metallic particles and glass covering the metallic particles, and connects the pair of opposed electrodes, the discharge auxiliary electrode film is arranged to cover at least a second region located between the pair of opposed electrodes and the first region on the ceramic base material facing the cavity section.

In addition, in the ESD protection device according to a preferred embodiment of the present invention, a barrier layer containing inorganic insulating material particles as its main constituent is provided between the discharge auxiliary electrode film and the ceramic base material.

In addition, the discharge auxiliary electrode film preferably also includes an inorganic oxide at a ratio of about 5 volume % to about 30 volume %, for example, relative to the combination of the metallic particles, the glass, and the inorganic oxide.

In addition, the discharge auxiliary electrode film preferably also includes a semiconductor powder at a ratio of about 5 volume % to about 50 volume %, for example, relative to the combination of the metallic particles and the semiconductor powder.

In addition, the metallic particles preferably are particles including Cu.

Furthermore, in the ESD protection device according to a preferred embodiment of the present invention, preferably, the opposed electrodes and the discharge auxiliary electrode film are disposed on the surface of the ceramic base material, and a protective film is disposed on the discharge auxiliary electrode film.

The protective film preferably includes the same type of glass as the glass covering the metallic particles.

According to yet another preferred embodiment of the present invention, a method for manufacturing an ESD protection device including a pair of opposed electrodes arranged at a predetermined distance on a surface of a ceramic base material; and a discharge auxiliary electrode film arranged continuously so as to cover each of the pair of opposed electrodes partially, and cover a region located at a surface of the ceramic base material and located between the pair of opposed electrodes, includes the steps of applying an electrode paste including glass-coated metallic particles defined by metallic particles covered with glass such that a rate of increase in weight for the glass-coated metallic particles is within a range of about 3% to about 15% at about 400° C. for about 2 hours in air, a resin binder, and a solvent, so as to cover each of the pair of electrodes partially, and the region located at the surface of the ceramic base material and between the pair of opposed electrodes; and carrying out firing at a temperature of about 600° C. or more, higher than a softening point of glass of the glass-coated metallic particles, and not +200° C. higher than the softening point, thereby forming a discharge auxiliary electrode film.

According to a further preferred embodiment of the present invention, a method for manufacturing an ESD protection device including a ceramic base material; a pair of opposed electrodes including ends opposed to each other at a predetermined distance on a surface of or in the ceramic base material; and a discharge auxiliary electrode film arranged to connect the pair of opposed electrodes, includes the steps of forming an unfired structure in which an electrode paste including glass-coated metallic particles defined by metallic particles covered with glass such that a rate of increase in weight for the glass-coated metallic particles is within a range of about 3% to about 15% at about 400° C. for about 2 hours in air, a resin binder, and a solvent, is formed to connect the pair of opposed electrodes to each other provided on the surface of or in the unfired ceramic base material; and carrying out firing at a temperature of about 600° C. or more, higher than a softening point of glass of the glass-coated metallic particles, and not +200° C. higher than the softening point, thereby forming a discharge auxiliary electrode film.

The ESD protection device according to a preferred embodiment of the present invention contains, as its main constituents, the metallic particles and glass as the discharge auxiliary electrode film so that an electrode film is formed to have a structure including the metallic particles covered with the glass, thus making it possible to provide an ESD protection device which is capable of protecting electronic appliances and electrical appliances reliably.

In addition, when the metallic particles are to be covered with the glass, as compared with a case of using a resin, it is possible to cover the surfaces of the metallic particles with a smaller amount of glass, with the result that the content of the metallic particles in the discharge auxiliary electrode film can be increased, thus making it possible to lower the discharge starting voltage. In addition, the peak voltage can be lowered in the case of applying static electricity to the ESD protection device.

Furthermore, the glass is less likely to be degraded even in the case of repetitive application of static electricity to the ESD protection device and discharge, thus making it possible to prevent and suppress characteristic degradation caused by the use of the ESD protection device, and provide an ESD protection device which is able to be used stably and reliably for a long period of time.

It is to be noted that the pair of opposed electrodes and the discharge auxiliary electrode film may be formed either on the surface of the ceramic base material or in the ceramic base material. However, providing the pair of opposed electrodes and the discharge auxiliary electrode film in the ceramic base material can make the device less affected by external influences to improve the reliability thereof.

In addition, when the barrier layer containing inorganic insulating material particles as its main constituent is provided between the discharge auxiliary electrode film and the ceramic base material, some of the glass (the glass covering the metallic particles) included in the discharge auxiliary electrode film penetrates through the barrier layer to suppress local excessive sintering between the metallic particles constituting the discharge auxiliary electrode film, thus allowing variation in initial insulation resistance to be reduced, and allowing an ESD protection device to be provided which has stable characteristics.

In addition, when the discharge auxiliary electrode film further contains the inorganic oxide at a ratio of about 5 volume % to about 30 volume %, for example, relative to the combination of the metallic particles, the glass, and the inorganic oxide, characteristic degradation can be further reduced in the case of repeating the application of static electricity and discharge.

The discharge auxiliary electrode film preferably further contains the semiconductor powder at a ratio of about 5 volume % to about 50 volume %, for example, relative to the combination of the metallic particles and the semiconductor powder, thereby achieving suppression of local excessive sintering between the metallic particles constituting the discharge auxiliary electrode film, and achieving reduction in occurrence frequency of initial short circuit defects.

In addition, the use of metallic particles including Cu as the metallic particles constituting the discharge auxiliary electrode film can constitute an ESD protection device which is able to lower the discharge starting voltage and the peak voltage.

Furthermore, the protective film provided on the discharge auxiliary electrode film makes it possible to provide an ESD protection device which is less affected by the outside atmosphere, etc. with higher reliability.

The use of, as the protective film, a material including the same type of glass as the glass constituting the discharge auxiliary electrode film and covering the metallic particles makes it possible to form a protective film with high reliability in terms of the junction with the discharge auxiliary electrode film, and thus makes preferred embodiments of the present invention.

Furthermore, the method for manufacturing an ESD protection device according to a preferred embodiment of the present invention, for the formation of the discharge auxiliary electrode film, uses an electrode paste which includes the glass-coated metallic particles defined by metallic particles covered with glass, the rate of increase in weight for the glass-coated metallic particles is preferably within a range of about 3% to about 15%, for example, at about 400° C. for about 2 hours in air, a resin binder, and a solvent, and carries out firing at a temperature of about 600° C. or more, higher than a softening point of glass of the glass-coated metallic particles, and not +200° C. higher than the softening point, thus making it possible to achieve an ESD protection device which is less likely to cause short circuit defects.

In addition, since the content of the metal in the discharge auxiliary electrode film can be increased, the discharge starting voltage can be lowered. In addition, the peak voltage can be lowered in the case of application of static electricity to the ESD protection device.

Furthermore, since the static electricity protective material layer contains no resin unlike conventional ESD protection devices, ESD protection devices can be achieved which are able to produce stable characteristics for a long period of time without bringing about characteristic degradation even when discharge is repeated.

It is to be noted that in various preferred embodiments of the present invention, the glass-coated metallic particles constituting the electrode paste for use in the formation of the discharge auxiliary electrode film preferably include metallic particles covered with the glass, and have the rate of increase in weight in the range of about 3% to about 15%, for example, at about 400° C. for about 2 hours in air, for example. Furthermore, the requirement for the glass-coated metallic particles "the rate of increase in weight in a range of about 3% to about 15% at about 400° C. for about 2 hours in air" has significance as an indicator of showing the degree of exposure of the metallic particles. When the section (exposed section) of the metallic particles covered with no glass is increased, the rate of increase in weight will be increased, and when the covered section is increased, the rate of increase in weight will be decreased.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

With reference to examples of the present invention, features of various preferred embodiments of the present invention will be described below in details.

Example 1

Figure 1:
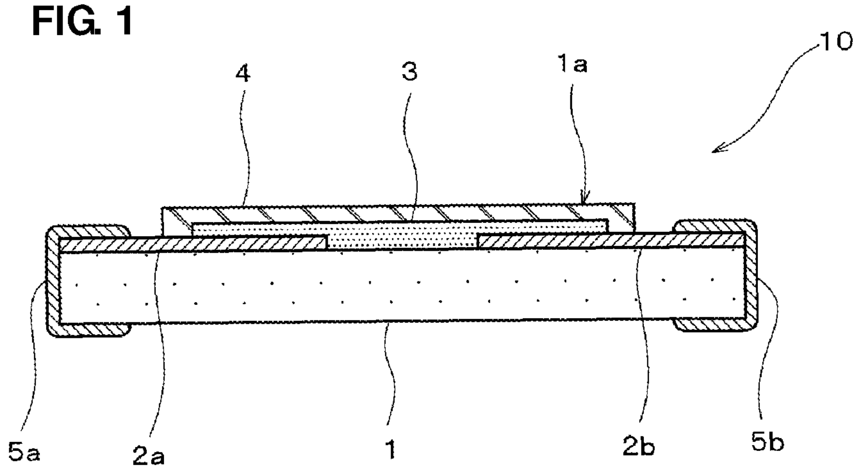
FIG. 1 is a front cross-sectional view schematically illustrating the structure of an ESD protection device according to an example (Example 1) of a preferred embodiment of the present invention.
Figure 2:
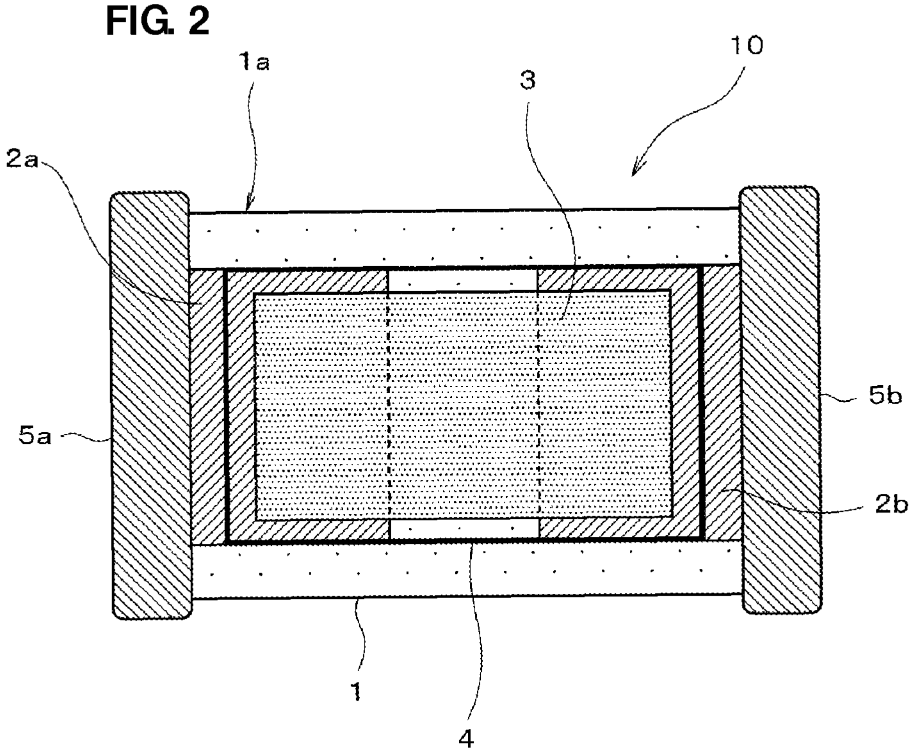
FIG. 2 is a plan view illustrating the structure of the ESD protection device according to Example 1 of a preferred embodiment of the present invention.

FIG. 1 is a front cross-sectional view schematically illustrating the structure of an ESD protection device according to an example (Example 1) of a preferred embodiment of the present invention, and FIG. 2 is a plan view thereof.

This ESD protection device 10 preferably includes, as shown in FIGS. 1 and 2, a ceramic base material 1, a pair of opposed electrodes 2*a* and 2*b* located on the ceramic base material 1, a discharge auxiliary electrode film 3 located between the pair of opposed electrodes 2*a* and 2*b*, a protective film 4 provided on the discharge auxiliary electrode film 3, and terminal electrodes 5*a* and 5*b* providing external electrical connections, which are provided on both ends of the ceramic base material 1 so as to provide conduction to the opposed electrodes 2*a* and 2*b*.

In Example 1, an alumina substrate which has a rectangular planar shape of about 1.0 mm in length, about 0.5 mm in width, and about 0.3 mm in thickness, for example, is preferably used as the ceramic base material 1.

The constituent material of the ceramic base material 1 has no limitations, and it is also possible to use other types of materials such as a silicon substrate, for example. It is to be noted that it is desirable to use, as the ceramic base material 1, a material with a relative permittivity of about 50 or less, and preferably about 10 or less, for example.

In addition, Cu thin film electrodes with Cu formed by sputtering are preferably used as the opposed electrodes 2*a* and 2*b*.

Furthermore, the discharge auxiliary electrode film 3 is formed by applying and firing an electrode paste for the formation of the discharge auxiliary electrode film, which is composed of a combination of glass-coated metallic particles defined by metallic particles with surfaces coated with glass, an inorganic oxide (while it is possible to use various types of oxides as the inorganic oxide, an alumina powder is preferably used in the case of the ESD protection device in FIGS. 1 and 2), an organic vehicle, and a dispersant.

Further, while a method for manufacturing the ESD protection device 10 according to a preferred embodiment of the present invention will be described later, glass-coated metallic particles prepared by various methods can be used for the formation of the discharge auxiliary electrode film 3.

More specifically, a method for producing the glass-coated metallic particles can include, for example, a method in which a solution containing a thermally degradable metallic compound and an inorganic oxide precursor solution for forming a vitreous material are sprayed into a spray pyrolytic furnace to form the glass-coated metallic particles, as described in Japanese Patent Application Laid-Open No. 10-330802. This approach has a high degree of freedom for the metal species and the glass composition, which is thus preferable for a preferred embodiment of the present invention.

Besides, other approaches for preparing the glass-coated metallic particles can include a method in which an aqueous solution of a glass forming component dissolved therein is added in the case of reacting metallic particles, an organosilane compound, and water in an aqueous organic solvent to form a film produced by hydrolysis of the organosilane, and adding a gelator to the obtained suspension to form a silica-based gel coating film on the surfaces of the metallic particles, as described in Japanese Patent Application Laid-Open No. 2004-149817.

Furthermore, other methods for preparing the glass-coated metallic particles include a method in which metallic particles and a finely ground glass powder are subjected to mechano-chemical bonding by a mechano-fusion method or other suitable method, for example.

It is to be noted that the discharge auxiliary electrode film 3 in the ESD protection device 10 according to Example 1 is preferably formed by applying and firing an electrode paste including glass-coated metallic particles of Cu particles as the metallic particles coated with Si—Ca—Ba based glass prepared by the method described in Japanese Patent Application Laid-Open No. 10-330802, and an alumina powder (inorganic oxide).

In addition, the protective film 4 is preferably formed by applying and firing a paste including Si—Ca—Ba based glass which has the same composition as the glass constituting the glass-coated metallic particles used for the formation of the discharge auxiliary electrode film 3, an alumina powder, and an organic vehicle.

In the ESD protection device 10 configured as described above, the discharge auxiliary electrode film 3 is formed by firing the electrode paste including the glass-coated metallic particles and the inorganic oxide. Thus, the ratio of the metallic particles in the discharge auxiliary electrode film 3 can be increased to suppress and prevent the occurrence of short circuit defects.

In addition, the ratio of the metallic particles in the discharge auxiliary electrode film 3 can be increased, thus making it possible to lower the discharge starting voltage.

Furthermore, the glass is less likely to be degraded, even in the case of repetitive application of static electricity to the ESD protection device 10 and discharge, the ESD protection device 10 can be used stably and reliably for a long period of time.

In addition, in the ESD protection device 10 according to this example, the discharge auxiliary electrode film 3 containing the alumina powder (inorganic oxide) at a ratio of about 5 volume % to about 30 volume %, for example, relative to the combination of the glass-coated metallic particles composed of the Cu particles and the glass with the alumina powder (inorganic oxide) can further suppress characteristic degradation in the case of repetitive application of static electricity and discharge.

Furthermore, the discharge starting voltage and the peak voltage can be lowered, because Cu particles are used as the metallic particles constituting the discharge auxiliary electrode film 3.

In addition, the protective film 4 provided on the discharge auxiliary electrode film 3 can make it less likely that the ESD protection device is affected by the outside atmosphere, etc., thereby further improving the reliability.

Next, a method will be described for manufacturing the ESD protection device 10 according to an example of a preferred embodiment of the present invention.

It is to be noted that in this example, as electrode pastes for use in the formation of the discharge auxiliary electrode film, electrode pastes were prepared by varying the type of the metallic particles constituting the glass-coated metallic particles, the composition and softening point of the glass coating the metallic particles, and the ratio of the glass to the glass-coated metallic particles, etc, and used to form discharge auxiliary electrode films.

In this example, such metallic particles of compositions as shown in sample numbers M-1 to M-12 of Table 1 were prepared as the metallic particles.

It is to be noted that the metallic particles of sample numbers M-1 to M-3 and M-5 to M-11 preferably are glass-coated metallic particles prepared by using the method in which a solution containing a thermally-degradable metallic compound and an inorganic oxide precursor solution for forming a vitreous material are sprayed into a spray pyrolytic furnace to form the glass-coated metallic particles (the method described in Japanese Patent Application Laid-Open No. 10-330802).

In Table 1, the sample numbers marked with a symbol * correspond to metallic particles which fail to meet the requirements of various preferred embodiments of the present invention.

TABLE 1

| | | Conditions of Coating Metallic Particles | | | |
|---|---|---|---|---|---|
| Sample Number | Metallic Particles | Type of Coating Component | Softening Point (° C.) | Amount of Coating (wt %) | Rate of Increase in Weight at about 400° C. for about 2 hours in Air (%) |
| M-1 | Cu 100 at % | Si—B—Zn Based Glass | 400 | 2 | 12 |
| M-2 | Cu 100 at % | Si—Ca—Ba Based Glass | 500 | 2 | 14 |
| M-3* | Cu 100 at % | Si—Ca—Ba Based Glass | 500 | 1 | 19 |
| M-4* | Cu 100 at % | — | — | 0 | 25 |
| M-5 | Cu 100 at % | Si—Ca—Ba Based Glass | 500 | 2 | 11 |
| M-6 | Cu 100 at % | Si—Ca—Ba Based Glass | 500 | 2 | 9 |
| M-7 | Cu 100 at % | Si—B—Zn Based Glass | 600 | 2 | 14 |
| M-8 | Cu 100 at % | Si—B Based Glass | 700 | 2 | 14 |
| M-9 | Cu 100 at % | Si—B Based Glass | 800 | 2 | 14 |
| M-10 | Cu/Ni = 99/1 at % | Si—Ca—Ba Based Glass | 600 | 2 | 10 |
| M-11 | Cu/Ni = 85/15 at % | Si—Ca—Ba Based Glass | 600 | 3 | 3 |
| M-12* | Cu 100 at % | $SiO_2$ Sol | — | 1 | 10 |

In addition, the metallic particles of sample number M-4 refer to metallic particles coated with no glass at 0% in the amount of glass (the amount of coating in Table 1).

In addition, the metallic particles of M-3 refer to metallic particles with the amount of glass (the amount of coating in Table 1) of about 1% and the rate of increase in weight of about 19% at about 400° C. for about 2 hours in air, whereas the metallic particles of sample number M-4 refer to metallic particles covered with no glass with the rate of increase in weight of about 25%, for example.

In addition, the metallic particles of sample number M-12 was prepared by the method (Japanese Patent Application Laid-Open No. 2004-149817) (sol-gel method) in which an aqueous solution of a glass forming component dissolved therein is added in the case of reacting metallic particles, an organosilane compound, and water in an aqueous organic solvent to form a film produced by hydrolysis of the organosilane, and adding a gelator to the obtained suspension to form a silica-based gel coating film on the surfaces of the metallic particles.

It is to be noted that in a preferred embodiment of the present invention, it is preferable for the glass-coated metallic particles to have metallic surfaces coated with glass and have about 15% or less for the rate of increase in weight at about 400° C. for about 2 hours in air, for example. The glass composition is not particularly limited.

The rate of increase in weight is to be defined by the following method. More specifically, the rate of increase in weight refers to a value obtained from the following formula (1):

Rate of Increase in Weight (%)=$100\times(T_1-T_0)/T_0$v . . . (1) in such a way that a TG-DTA apparatus (TAS300, manufactured by Rigaku Corporation) is used to measure the initial weight $T_0$ of the sample and the weight $T_1$ thereof at about 400° C. for about 2 hours under the conditions of:

(a) sample weight: about 30 mg, (b) atmosphere gas: air, (c) flow rate of atmosphere gas: about 200 ml/minute, (d) cell: α alumina, and (e) profile: heating from room temperature to about 400° C. at about 20° C./minute→keeping at about 400° C. for about 2 hours.

If the rate of increase in weight for the glass-coated metallic particles is greater than about 15% at about 400° C. for about 2 hours in air, the metallic surfaces have a low coverage with glass, and the ESD protection device 10 prepared with the use of the metallic particles is thus unfavorably more likely to cause a short circuit defect.

Alternatively, if the rate of increase in weight for the glass-coated metallic particles is less than about 3% at about 400° C. for about 2 hours in air, the metallic surfaces have a high coverage with glass, and the ESD protection device 10 prepared with the use of the metallic particles thus unfavorably tends to have an increased discharge starting voltage.

Further, even when the rate of increase in weight is about 15% or less at about 400° C. for about 2 hours in air, the case of metallic surfaces coated with a component other than the glass, for example, a resin causes the ESD protection device 10 prepared with the use of the metallic particles to have insufficient adhesion between the ceramic substrate and the metallic particles, and thus tends to have degraded repetition characteristics.

Next, an alumina powder with an average particle diameter of about 0.03 μm and a specific surface area of about 55 $m^2$/g and a silica powder with an average particle diameter of about 1.0 μm and a specific surface area of about 10 $m^2$/g, for example, were prepared as inorganic oxides.

In addition, an ethyl cellulose resin with a weight average molecular weight of about $5\times10^4$ was prepared as a resin binder, and terpineol was prepared as a solvent, for example. Then, the ethyl cellulose resin was dissolved at a ratio of about 11 weight %, for example, in this solvent to prepare an organic vehicle.

Furthermore, a dispersant of a polyfatty acid amine salt with a base content of about 880 μmol/g and an acid content of about 980 μmol/g was prepared as the dispersant, for example.

Then, the glass-coated metallic particles, inorganic oxide, organic vehicle, and dispersant prepared in this way were blended to provide the composition in Table 2, and kneaded and dispersed with the use of three rolls, thereby preparing an electrode paste for forming the discharge auxiliary electrode film.

TABLE 2

| Sample | Type and Ratio of Metallic Particles | | | | | | | | | | | | Type and Ratio of Inorganic Oxide (volume %) | |
|---|---|---|---|---|---|---|---|---|---|---|---|---|---|---|
| Number | M-1 | M-2 | M-3 | M-4 | M-5 | M-6 | M-7 | M-8 | M-9 | M-10 | M-11 | M-12 | Alumina | Silica |
| 1 | — | 14.0 | — | — | — | — | — | — | — | — | — | — | — | — |
| 2 | — | 14.0 | — | — | — | — | — | — | — | — | — | — | — | — |
| 3 | — | 13.3 | — | — | — | — | — | — | — | — | — | — | 0.7 | — |
| 4 | — | 12.6 | — | — | — | — | — | — | — | — | — | — | 1.4 | — |
| 5 | — | 11.9 | — | — | — | — | — | — | — | — | — | — | 2.1 | — |
| 6 | — | 11.2 | — | — | — | — | — | — | — | — | — | — | 2.8 | — |
| 7 | — | 12.6 | — | — | — | — | — | — | — | — | — | — | — | 1.4 |
| 8 | — | 11.2 | — | — | — | — | — | — | — | — | — | — | — | 2.8 |
| 9 | — | 9.8 | — | — | — | — | — | — | — | — | — | — | — | 4.2 |
| 10 | — | 14.0 | — | — | — | — | — | — | — | — | — | — | — | — |
| 11* | — | 14.0 | — | — | — | — | — | — | — | — | — | — | — | — |
| 12* | — | 14.0 | — | — | — | — | — | — | — | — | — | — | — | — |
| 13* | — | 14.0 | — | — | — | — | — | — | — | — | — | — | — | — |
| 14 | 14.0 | — | — | — | — | — | — | — | — | — | — | — | — | — |
| 15* | 14.0 | — | — | — | — | — | — | — | — | — | — | — | — | — |
| 16* | 14.0 | — | — | — | — | — | — | — | — | — | — | — | — | — |
| 17* | — | — | 14.0 | — | — | — | — | — | — | — | — | — | — | — |
| 18* | — | — | — | 14.0 | — | — | — | — | — | — | — | — | — | — |
| 19* | — | — | — | 11.2 | — | — | — | — | — | — | — | — | 2.8 | — |
| 20* | — | — | — | 9.8 | — | — | — | — | — | — | — | — | — | 4.2 |
| 21 | — | — | — | — | 14.0 | — | — | — | — | — | — | — | — | — |

TABLE 2-continued

| | | | | | | | | | | | | | | |
|---|---|---|---|---|---|---|---|---|---|---|---|---|---|---|
| 22 | — | — | — | — | — | 14.0 | — | — | — | — | — | — | — | — |
| 23 | — | — | — | — | — | — | 14.0 | — | — | — | — | — | — | — |
| 24 | — | — | — | — | — | — | — | 14.0 | — | — | — | — | — | — |
| 25 | — | — | — | — | — | — | — | — | 14.0 | — | — | — | — | — |
| 26 | — | — | — | — | — | — | — | — | — | 14.0 | — | — | — | — |
| 27 | — | — | — | — | — | — | — | — | — | — | 14.0 | — | — | — |
| 28* | — | — | — | — | — | — | — | — | — | — | — | 14.0 | — | — |
| 29* | — | — | — | — | — | — | — | — | — | — | — | 14.0 | — | — |
| 30* | — | — | — | — | — | — | — | — | — | — | — | 14.0 | — | — |

| Sample Number | Organic Vehicle (volume %) | Dispersant (volume %) | Inorganic Oxide (volume %) | Glass Softening Point (° C.) | Firing Temperature (° C.) |
|---|---|---|---|---|---|
| 1 | 86.0 | — | 0 | 500 | 700 |
| 2 | 84.0 | 2.0 | 0 | 500 | 700 |
| 3 | 84.0 | 2.0 | 5 | 500 | 700 |
| 4 | 84.0 | 2.0 | 10 | 500 | 700 |
| 5 | 84.0 | 2.0 | 15 | 500 | 700 |
| 6 | 84.0 | 2.0 | 20 | 500 | 700 |
| 7 | 84.0 | 2.0 | 10 | 500 | 700 |
| 8 | 84.0 | 2.0 | 20 | 500 | 700 |
| 9 | 84.0 | 2.0 | 30 | 500 | 700 |
| 10 | 84.0 | 2.0 | 0 | 500 | 600 |
| 11* | 84.0 | 2.0 | 0 | 500 | 500 |
| 12* | 84.0 | 2.0 | 0 | 500 | 400 |
| 13* | 84.0 | 2.0 | 0 | 500 | 800 |
| 14 | 84.0 | 2.0 | 0 | 400 | 600 |
| 15* | 84.0 | 2.0 | 0 | 400 | 500 |
| 16* | 84.0 | 2.0 | 0 | 400 | 400 |
| 17* | 84.0 | 2.0 | 0 | 500 | 700 |
| 18* | 84.0 | 2.0 | 0 | — | 700 |
| 19* | 84.0 | 2.0 | 20 | — | 700 |
| 20* | 84.0 | 2.0 | 30 | — | 700 |
| 21 | 84.0 | 2.0 | 0 | 500 | 700 |
| 22 | 84.0 | 2.0 | 0 | 500 | 700 |
| 23 | 84.0 | 2.0 | 0 | 600 | 800 |
| 24 | 84.0 | 2.0 | 0 | 700 | 900 |
| 25 | 84.0 | 2.0 | 0 | 800 | 900 |
| 26 | 84.0 | 2.0 | 0 | 600 | 800 |
| 27 | 84.0 | 2.0 | 0 | 600 | 800 |
| 28* | 84.0 | 2.0 | 0 | — | 600 |
| 29* | 84.0 | 2.0 | 0 | — | 800 |
| 30* | 84.0 | 2.0 | 0 | — | 1000 |

It is to be noted that Table 2 shows, in the type and ratio of the inorganic oxide, whether either the alumina powder or the silica powder, or neither the alumina powder nor the silica powder was used as the inorganic oxide, and numerical values for indicating the ratio (volume %) of the inorganic oxide in the electrode paste.

In addition, in Table 2, the volume % of the inorganic oxide indicates the volume ratio of the inorganic oxide to the total of the glass-coated metallic particles and the inorganic oxide.

In addition, an alumina substrate having a rectangular planar shape of about 1.0 mm in length, about 0.5 mm in width, and about 0.3 mm in thickness, for example, was prepared as the ceramic base material. It is to be noted that, as described above, the constituent material of the ceramic base material has no limitations, and it is also possible to use other types of materials such as a silicon substrate.

Figure 3:
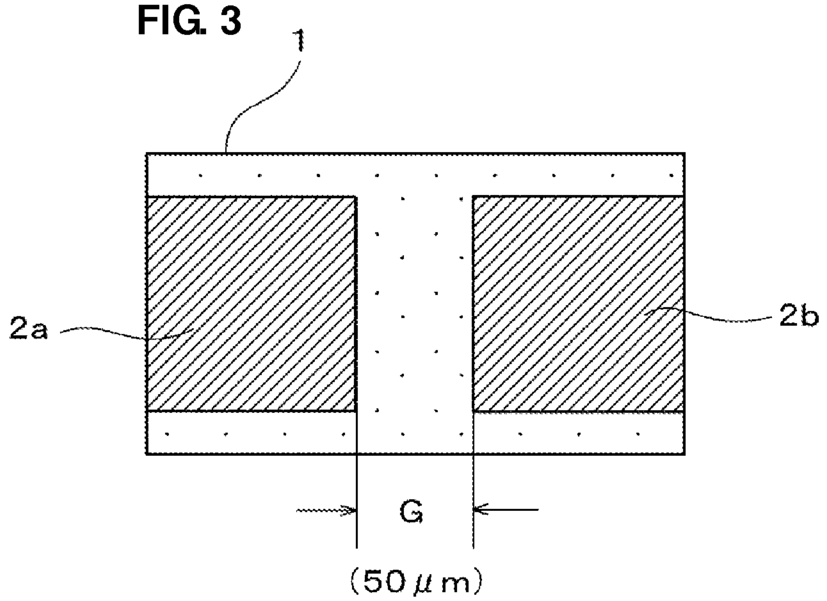
FIG. 3 is a view illustrating opposed electrodes formed on a ceramic base material in the step of a method for manufacturing an ESD protection device according to Example 1 of a preferred embodiment of the present invention.

Then, as shown in FIG. 3, a pair of opposed electrodes 2*a* and 2*b* composed of Cu with a thickness of about 10 nm to about 20 μm, for example, preferably are formed by sputtering onto the ceramic base material 1 so as to be opposed to each other. It is to be noted that a gap G between the pair of opposed electrodes 2*a* and 2*b* was adjusted to about 50 μm, for example.

Figure 4:
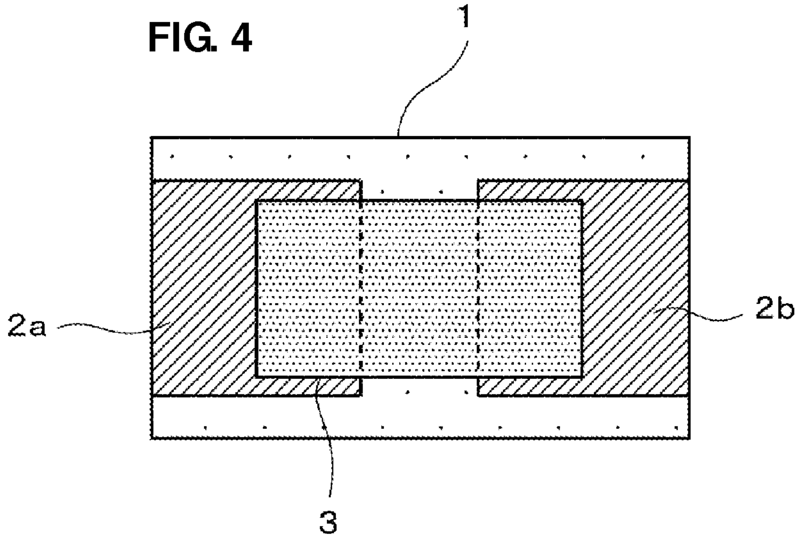
FIG. 4 is a view illustrating an unfired discharge auxiliary electrode film formed in the step of the method for manufacturing an ESD protection device according to Example 1 of a preferred embodiment of the present invention.

Then, the electrode paste for forming the discharge auxiliary electrode film prepared in the way described above was printed by using a screen printing method to provide a thickness of about 5 μm to about 50 μm, for example, thereby forming an unfired discharge auxiliary electrode film 3 having a rectangular planar shape, as shown in FIG. 4. In this case, the discharge auxiliary electrode film 3 is preferably formed continuously so as to partially cover the electrode 2*a*, of the pair of opposed electrodes 2*a* and 2*b*, cover the region of the surface of the ceramic base material 1 located between the pair of opposed electrodes 2*a* and 2*b*, and reach the other electrode 2*b* and partially cover the other electrode 2*b*, as shown in FIG. 4.

Figure 5:
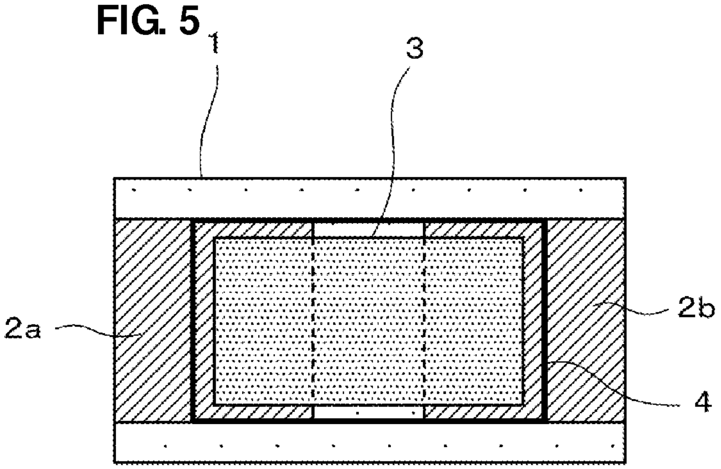
FIG. 5 is a view illustrating an unfired protective film formed on the discharge auxiliary electrode film in the step of the method for manufacturing an ESD protection device according to Example 1 of a preferred embodiment of the present invention.

Then, a paste composed of an alumina powder, glass, and an organic vehicle was applied by screen printing in a form as shown in FIG. 5 on the unfired discharge auxiliary electrode film 3, and dried to form an unfired protective film 4. It is to be noted that the glass used in the paste for forming the protective film 4 is preferably the same glass as the glass used for the glass-coated metallic particles. It is to be noted that the alumina powder is preferably the same as the alumina powder as the inorganic oxide blended in the glass-coated metallic particles.

Then, the ceramic base material 1 with the opposed electrodes 2*a* and 2*b*, the unfired discharge auxiliary electrode film 3, and the protective film 4 formed as described above was subjected to firing in a firing furnace to provide an element 1*a* (FIGS. 1 and 2) including the opposed electrodes 2*a* and 2*b*, the fired discharge auxiliary electrode layer 3 and the protective film 4 on the ceramic base material 1. It is to be noted that in the firing treatment, a degreasing treatment was carried out as a first step at about 400° C. for about 30 minutes in a nitrogen atmosphere, and firing was carried out as a second step at the firing temperature shown in Table 2 for about 30 minutes in a nitrogen-water-hydrogen atmosphere, for example.

Then, an Ag paste was applied onto both ends of the fired element so as to be electrically connected to the ends of the opposed electrodes 2*a* and 2*b*, and subjected to drying, and then firing to form terminal electrodes 5*a* and 5*b* on both ends of the ceramic base material 1 as shown in FIGS. 1 and 2. Thus, the ESD protection devices 10 (the samples of sample numbers 1 to 30 in Table 2) are provided which have the structure as shown in FIGS. 1 and 2.

It is to be noted that in Table 2, the samples of sample numbers designated with a symbol * correspond to samples according to comparative examples outside the scope of the present invention.

The samples (ESD protection devices) prepared in the way described above were examined by the following methods for respective characteristics of initial short circuit characteristics, discharge starting voltage characteristics, peak voltage characteristics, and repetition characteristics, and based on the results, the respective samples (ESD protection devices) were evaluated comprehensively.

(i) Initial Short Circuit Characteristics

A direct-current voltage of 50 volts was applied to the terminal electrodes 5*a* and 5*b* of each sample (ESD protection device) to measure the insulation resistance. The sample exhibiting an insulation resistance of $10^8\Omega$ or more was determined as a sample with good initial short circuit characteristics "○", whereas the sample exhibiting an insulation resistance less than $10^8\Omega$ was determined as a sample with defective initial short circuit characteristics "×". It is to be noted that the ESD protection device determined to be defective in terms of initial short circuit characteristics was not evaluated for discharge starting voltage characteristics and peak voltage characteristics.

(ii) Discharge Starting Voltage Characteristics

Figure 6:
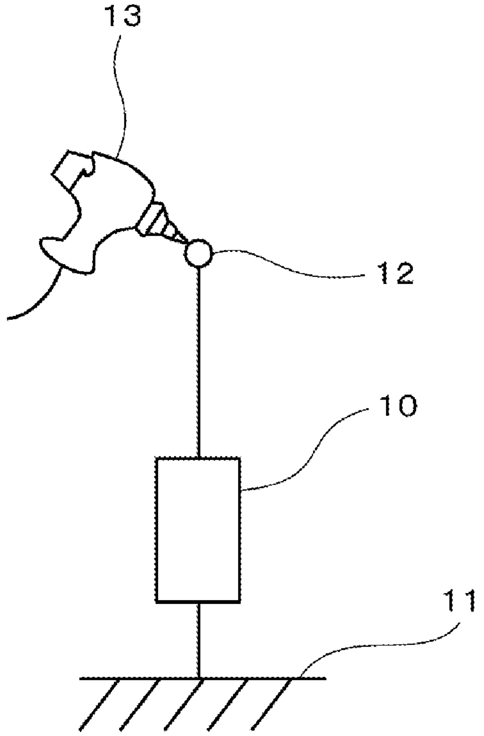
FIG. 6 is a view for explaining a method for measuring discharge starting voltage characteristics of an ESD protection device according to Example 1 of a preferred embodiment of the present invention.

As shown in FIG. 6, one terminal of each sample (ESD protection device 10) was connected to ground 11, and a static electricity test gun 13 was brought into contact with a static electricity pulse application section 12 drawn from the other terminal to apply a static electricity pulse of 300 volts. The sample discharging, causing breakdown, and providing conduction during the static electricity application was determined as a sample with good discharge starting voltage characteristics "○".

(iii) Peak Voltage Characteristics

Figure 7:
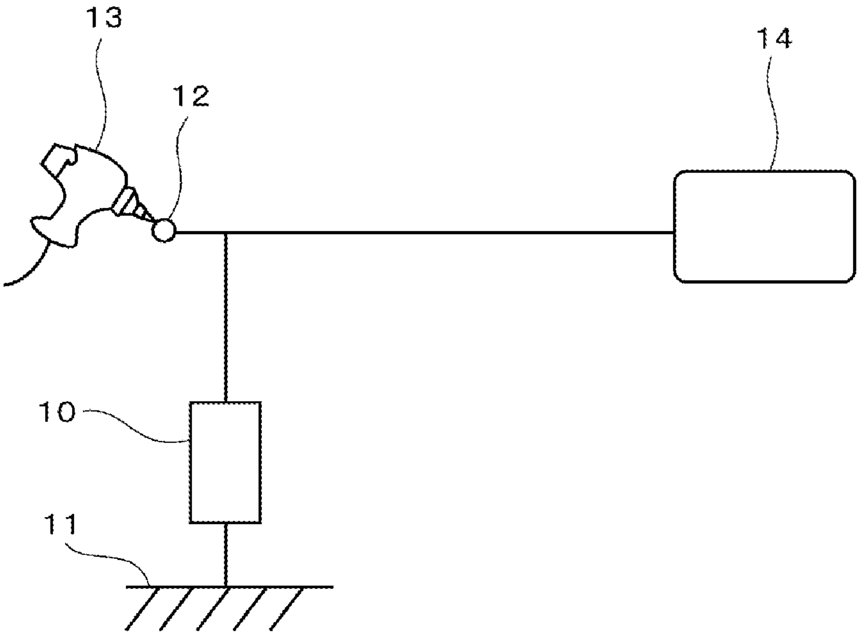
FIG. 7 is a view for explaining a method for measuring peak voltage characteristics of an ESD protection device according to Example 1 of a preferred embodiment of the present invention.

As shown in FIG. 7, a circuit composed of each sample (ESD protection device 10), the static electricity test gun 13, and an oscilloscope 14 was formed, and the static electricity test gun 13 was brought into contact with the static electricity pulse application section 12 to apply a static electricity of 8 kvolt. In that regard, the voltage measured by the oscilloscope 14 was defined as a peak voltage, and the sample with a peak voltage less than 500 volts was determined as a sample with good peak voltage characteristics "○", whereas the sample with a peak voltage of 500 volts or more was determined as a sample with defective peak voltage characteristics "×".

(iv) Repetition Characteristics

The same circuit as in (iii) Peak Voltage Characteristics Evaluation was formed, and the static electricity test gun 13 was brought into contact with the static electricity pulse application section 12 to apply a static electricity of 8 kvolt 10 times. After applying the static electricity 10 times, a static electricity of 8 kvolt was applied again to measure the peak voltage, and when the peak voltage was 500 volts or more, the sample was determined as a sample with defective repetition characteristics "×". Next, for the samples with a peak voltage less than 500 volts, a static electricity of 8 kvolts was further applied 100 times, static electricity was applied again to measure the peak voltage, and the sample was determined as a sample with good repetition characteristics "○" when the peak voltage was 500 volts or more, whereas the sample was determined as a sample with excellent repetition characteristics "⊙" when the peak voltage was less than 500 volts.

(v) Comprehensive Evaluation

In the evaluations of the respective characteristics, the sample with all of the characteristics good was determined as a good sample "○", and further, above all, the sample with repetition characteristics ⊙ was determined as an excellent sample "⊙".

In addition, the sample with any one defective recognized in the respective characteristics was determined as a defective "×".

Table 3 shows the results of examining the respective characteristics as described above.

TABLE 3

| | ESD Characteristics | | | | |
|---|---|---|---|---|---|
| Sample Number | Short Circuit Characteristics | Discharge Starting Voltage Characteristics | Peak Voltage Characteristics | Repetition Characteristics | Comprehensive Evaluation |
| 1 | ○ | ○ | ○ | ○ | ○ |
| 2 | ○ | ○ | ○ | ○ | ○ |
| 3 | ○ | ○ | ○ | ⊙ | ⊙ |
| 4 | ○ | ○ | ○ | ⊙ | ⊙ |
| 5 | ○ | ○ | ○ | ⊙ | ⊙ |
| 6 | ○ | ○ | ○ | ⊙ | ⊙ |
| 7 | ○ | ○ | ○ | ⊙ | ⊙ |
| 8 | ○ | ○ | ○ | ⊙ | ⊙ |
| 9 | ○ | ○ | ○ | ⊙ | ⊙ |
| 10 | ○ | ○ | ○ | ○ | ○ |
| 11* | X | — | — | — | X |
| 12* | X | — | — | — | X |
| 13* | X | — | — | — | X |
| 14 | ○ | ○ | ○ | ○ | ○ |
| 15* | X | — | — | — | X |
| 16* | X | — | — | — | X |

TABLE 3-continued

| | ESD Characteristics | | | | |
|---|---|---|---|---|---|
| Sample Number | Short Circuit Characteristics | Discharge Starting Voltage Characteristics | Peak Voltage Characteristics | Repetition Characteristics | Comprehensive Evaluation |
| 17* | X | — | — | — | X |
| 18* | X | — | — | — | X |
| 19* | X | — | — | — | X |
| 20* | X | — | — | — | X |
| 21 | ○ | ○ | ○ | ○ | ○ |
| 22 | ○ | ○ | ○ | ○ | ○ |
| 23 | ○ | ○ | ○ | ○ | ○ |
| 24 | ○ | ○ | ○ | ○ | ○ |
| 25 | ○ | ○ | ○ | ○ | ○ |
| 26 | ○ | ○ | ○ | ○ | ○ |
| 27 | ○ | ○ | ○ | ○ | ○ |
| 28* | ○ | ○ | ○ | X | X |
| 29* | ○ | ○ | ○ | X | X |
| 30* | X | — | — | — | X |

The mark — indicates no evaluation due to short circuit defect.

As shown in FIG. 3, it was confirmed that the ESD protection devices of sample numbers 1 to 10, 14, and 21 to 27 which meet the requirements of preferred embodiments of the present invention exhibit excellent ESD characteristics (initial short circuit characteristics, discharge starting voltage characteristics, peak voltage characteristics, repetition characteristics).

In addition, it was confirmed that the ESD protection devices of sample numbers 11, 12, 15, and 16 have defective initial short circuit characteristics. This is believed to be because carbon derived from the resin remained in the discharge auxiliary electrode layer at the firing temperature less than about 600° C., resulting in the defective initial short circuit characteristics under the influence of the carbon, in the case of the ESD protection devices of sample numbers 11, 12, 15, and 16 (see Table 2).

In addition, the ESD protection device of sample number exhibited defective initial short circuit characteristics. This is believed to be because the firing carried out at the elevated firing temperature greater than "the softening point of the glass+200° C." lowered the glass viscosity at the metallic surface in the firing process to produce liquid-phase sintering of the metallic particles with each other, thus causing the defective initial short circuit characteristics.

In addition, in the case of the ESD protection devices according to Examples 17 to 20, the occurrence of defective initial short circuit characteristics was recognized. This is believed to be because the use of the glass-coated metallic particles M-3 and M-4 in Table 1 with the rate of increase in weight greater than about 15% at about 400° C. for about 2 hours in air then provided metallic particle surfaces incompletely covered with the glass, and thus caused the metallic surfaces covered with no glass to come into contact with each other, thereby causing the defective initial short circuit characteristics. It is to be noted that sample number 17 refers to a sample using the glass-coated metallic particles of sample number M-3 in Table 1, with the rate of increase in weight of about 19%, whereas sample numbers 18 to 20 refer to samples using the metallic particles of sample number M-4 in Table 1, with the rate of increase in weight of about 25%, which are covered with no glass.

In addition, in the case of the ESD protection devices according to Examples 28 to 30, the occurrence of defective repetition characteristics was recognized. This is believed to be because, in the case of the ESD protection devices according to Examples 28 to 30, the use of the glass-coated metallic particles of M-12 in Table 1 with the metallic particle surfaces coated with a $SiO_2$ sol as a component other than glass provided insufficient adhesion between the fired metallic particles and the ceramic substrate, and thus made it easy for the metallic particles to move during the discharge, thereby resulting in the defective repetition characteristics. In addition, in the case of the ESD protection device according to Example 30, defective initial short circuit characteristics were also recognized. This is because the high firing temperature of 1000° C. thus resulted in sintering of the metallic particles with each other. This indicates the fact that in the case of adopting an approach of increasing the firing temperature in order to ensure the adhesion between the metallic particles and the ceramic substrate, sintering of the metallic particles with each other will be caused to lead to defective initial short circuit characteristics.

Further, the ESD protection devices of sample numbers 3 to 9 have high insulating properties, and particularly have excellent repetition characteristics, and for these samples, the discharge auxiliary electrode films were formed by using an electrode paste containing the inorganic oxide in a range of about 5 volume % to about 30 volume %, for example, relative to the glass-coated metallic particles. From these results for sample numbers 3 to 8, it is understood that the moderate amount of inorganic oxide contained in the discharge auxiliary electrode film can increase the insulating properties, and improve the repetition characteristics.

It is to be noted that while the glass-coated metallic particles with the ratio of glass of about 2 weight % (M-1, M-2, and M-5 to M-10 in Table 1) are used as the glass-coated metallic particles which satisfy the requirements of preferred embodiments of the present invention in the example described above, the ratio of the glass in the glass-coated metallic particles is not to be limited thereto, and can also be adjusted to a different ratio in consideration of the relationship with other conditions in the present invention.

In addition, while the alumina powder or the silica powder preferably is contained as the inorganic oxide at a ratio of 0 to about 30 volume % relative to the glass-coated metallic particles in the example described above, the inorganic oxide can be contained at a ratio greater than this range in some cases. However, the addition of the inorganic oxide greater than about 30 volume % tends to be likely to lower the discharge starting voltage characteristics, the peak voltage characteristics, the repetition characteristics, etc. in some cases.

In addition, in the case of adding the inorganic oxide, the addition effect is normally less likely to be produced at less than about 5 volume %.

Therefore, in the case of adding the inorganic oxide, the ratio thereof preferably is about 5 volume % to about 30 volume %, for example.

Modification Example

Figure 8:
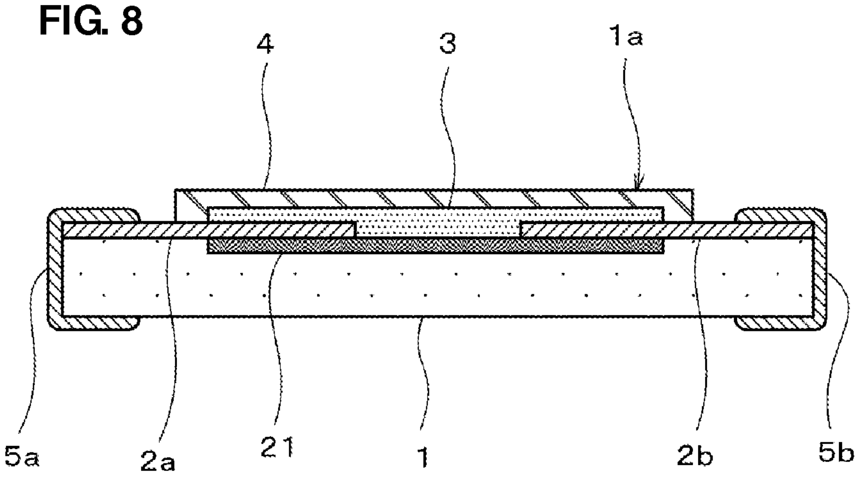
FIG. 8 is a view illustrating a modification example of an ESD protection device according to Example 1 of a preferred embodiment of the present invention.

FIG. 8 illustrates a modification example of the ESD protection device according to Example 1. This ESD protection device in FIG. 8 preferably has a structure in which a barrier layer 21 containing inorganic insulating material particles (alumina particles in Example 1) as its main constituent is arranged so as to lie between the discharge auxiliary electrode film 3 and the tip sections of the pair of opposed electrodes 2*a* and 2*b* and the ceramic base material 1.

In this ESD protection device in FIG. 8, some of the glass (the glass covering the metallic particles) included in the discharge auxiliary electrode film 3 penetrates through the barrier layer 21 to prevent and suppress local excessive sintering between the metallic particles constituting the discharge auxiliary electrode film 3, thus allowing variation in initial insulation resistance to be reduced, and allowing an ESD protection device to be provided which has stable characteristics.

Example 2

Figure 9:
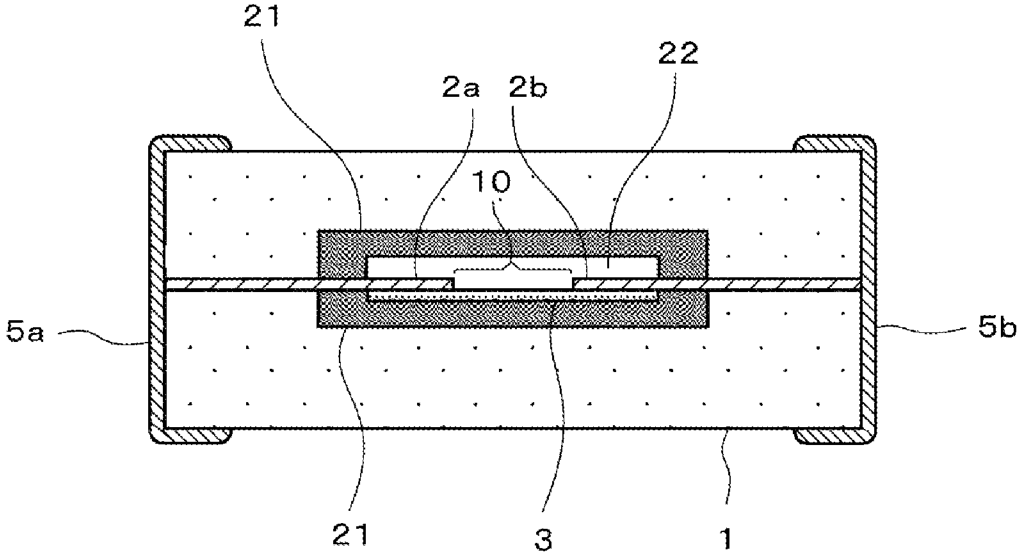
FIG. 9 is a front cross-sectional view schematically illustrating the structure of an ESD protection device according to another example (Example 2) of a preferred embodiment of the present invention.
Figure 10:
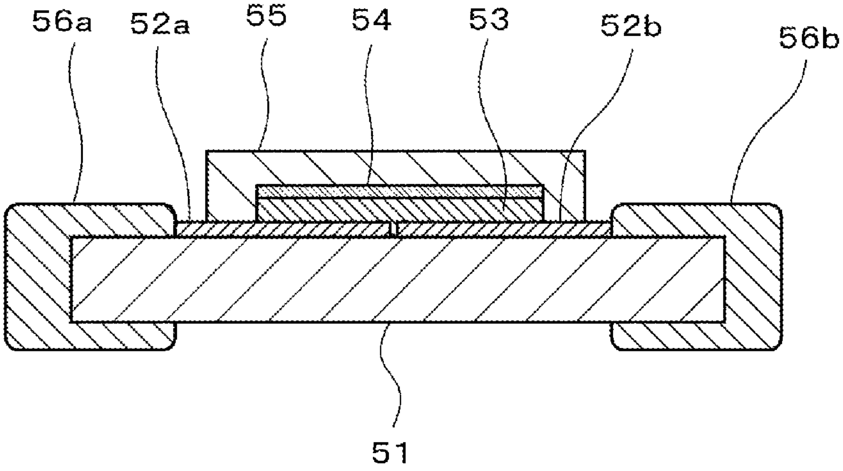
FIG. 10 PRIOR ART
FIG. 10 is a view illustrating a conventional component for providing a countermeasure against static electricity (ESD protection device).

FIG. 9 is a front cross-sectional view schematically illustrating the structure of an ESD protection device according to another example (Example 2) of a preferred embodiment of the present invention.

This ESD protection device 10 includes, as shown in FIG. 9, a pair of opposed electrodes 2*a* and 2*b* with tip sections provided in a cavity section 22 in a ceramic base material 1, a discharge auxiliary electrode film 3 provided between the pair of opposed electrodes 2*a* and 2*b*, and terminal electrodes 5*a* and 5*b* for external electrical connections, which are provided on both ends of the ceramic base material 1 so as to provide conduction to the opposed electrodes 2*a* and 2*b*.

Furthermore, in this ESD protection device according to Example 2, a barrier layer 21 containing insulating material particles (alumina particles in this example) as its main constituent is arranged so as to surround a section to serve as the ESD protection device, that is, a cavity section 22 provided with a functional section including the opposed sections of the opposed electrodes 2*a* and 2*b* and the discharge auxiliary electrode film 3, etc, and the discharge auxiliary electrode film 3 is arranged over the ceramic base material 1 with the barrier layer 21 interposed therebetween.

It is to be noted that the pair of opposed electrodes 2*a* and 2*b* and the discharge auxiliary electrode film 3 are provided in the ceramic base material 1 in the case of this ESD protection device according to Example 2, and the protective film provided in the example is thus not provided. However, it is also possible to form a protective film in terms of further improvement in reliability.

Next, a method will be described for manufacturing this ESD protection device.

For a ceramic green sheet for forming the ceramic base material, non-glass based low-temperature sintering ceramic materials composed of compositions mainly including Ba, Al, or Si were preferably used as ceramic materials.

For the preparation of the ceramic green sheet, first, the respective materials were blended and mixed so as to provide a predetermined composition, and subjected to calcination at about 800° C. to about 1000° C., for example. The calcined powder obtained was subjected to grinding in a zirconia ball mill for about 12 hours to obtain a ceramic powder. This ceramic powder with an organic solvent such as toluene or Ekinen added thereto was mixed. Furthermore, a butyral resin, an imidazoline type antistatic agent (sulfonic acid as the counter anion), and a plasticizer were added and mixed to obtain a slurry. The slurry obtained in this way was subjected to shape forming by a doctor blade method, thereby providing a ceramic green sheet with a thickness of about 50 μm, for example.

It is to be noted that this ceramic green sheet produces a glass component in a firing process, which serves as a glass ceramic base material after firing.

An approximately 40 weight % of Cu powder with a particle diameter of about 1 μm, an approximately 40 weight % of Cu powder with a particle diameter of about 3 μm, and an approximately 20 weight % of organic vehicle prepared by dissolving ethyl cellulose in terpineol were blended, and mixed with the use of three rolls to prepare an electrode paste for the formation of opposed electrodes.

As an electrode paste for use in the formation of a discharge auxiliary electrode film, the same electrode paste as in Example 1 described above was preferably prepared.

An approximately 38 weight % of cross-linked acrylic resin beads with an average particle size of approximately 1 μm and an approximately 62 weight % of organic vehicle prepared by dissolving ethyl cellulose in dihydroterpinyl acetate were blended, and mixed with the use of three rolls to prepare a resin paste for the formation of the cavity section.

An approximately 50 weight % of alumina powder with an average particle diameter of approximately 0.5 μm and an approximately 50 weight % of organic vehicle prepared by dissolving ethyl cellulose in terpineol were blended, and mixed with the use of three rolls to prepare a paste (alumina paste) for the formation of the barrier layer.

An approximately 80 weight % of Cu powder with an average particle diameter of approximately 1 μm, an approximately 5 weight % of borosilicate alkaline glass frit with a transition point of about 620° C., a softening point of about 720° C., and an average particle diameter of approximately 1 μm, and an approximately 15 weight % of organic vehicle prepared by dissolving ethyl cellulose in terpineol were blended, and mixed with the use of three rolls to prepare an electrode paste for the formation of external electrodes.

The paste for the formation of the barrier layer (alumina paste) first was applied onto one principal surface of the ceramic green sheet to form an unfired barrier layer.

Then, the electrode paste for the formation of the discharge auxiliary electrode was applied onto the unfired barrier layer to form an unfired discharge auxiliary electrode film.

Then, the electrode paste for the formation of the oppose electrodes was applied onto the unfired discharge auxiliary electrode film to form opposed electrodes on one and the other sides for constituting unfired opposed electrodes. Thus, a discharge gap is formed between the ends of the opposed electrodes on one and the other sides, which are opposed to each other.

It is to be noted that the width W of the opposed electrodes on one and the other sides to define the opposed electrodes and the dimension of the discharge gap therebetween preferably were respectively adjusted to about 100 μm and about 20 μm, for example, in Example 2.

Then, the resin paste for the formation of the cavity section was applied onto the unfired discharge auxiliary electrode film and the unfired opposed electrodes to form an unfired cavity section forming layer.

Then, the paste for the formation of the barrier layer was applied onto the unfired cavity section forming layer to form an unfired barrier layer.

Thus, a ceramic green sheet including a structure to serve as a functional section as an ESD protection device is obtained, in which the unfired barrier layer, the unfired discharge auxiliary electrode film, the unfired pair of opposed electrodes, and the unfired cavity section forming layer are provided on the ceramic green sheet, and the unfired barrier layer is further arranged so as to cover the cavity section forming layer.

A predetermined number of ceramic green sheets were stacked on one and the other principal surfaces of the ceramic green sheet including the structure to serve as a functional section as an ESD protection device, as prepared in according with the method described above, and subjected to pressure bonding to obtain an unfired laminated body with a thickness of approximately 500 μm, for example.

The laminated body prepared as described above was cut by a microcutter so as to provide a planar shape with a length of about 1.0 mm and a width of about 0.5 mm after firing, for example.

Then, the external electrode paste is applied onto the cut end surfaces of the laminated body so as to be connected to the opposed electrodes, thereby forming unfired external electrodes, and the unfired external electrodes are then subjected to firing, thereby providing an unfired structure to serve as an ESD protection device.

The unfired structure prepared as described above was subjected to firing under the same conditions as in the case of Example 1 described above, thereby achieving an ESD protection device according to Example 2 including the structure as shown in FIG. 9.

It was confirmed that this ESD protection device according to Example 2 essentially achieves the same effects and advantages as achieved by the ESD protection device according to Example 1.

Furthermore, it was confirmed that the ESD protection device according to Example 2, in which the functional section is provided with the cavity section in the ceramic base material as described above, and the cavity section is provided above the discharge auxiliary electrode film, increases the amount of discharge during ESD application to prevent and suppress any variations in peak voltage characteristics.

In addition, there was confirmed a tendency that the variation in initial resistance value is also reduced in the ESD protection device according to Example 2. This is believed to be because the discharge auxiliary electrode film is arranged over the ceramic base material with the barrier layer interposed therebetween, and some of the glass (the glass covering the metallic particles) included in the discharge auxiliary electrode thus penetrates through the barrier layer to prevent and suppress local excessive sintering between the metallic particles constituting the discharge auxiliary electrode film.

It is to be noted that while the alumina powder is preferably used as the material (inorganic insulating material particles) constituting the paste for the formation of the barrier layer in the example described above, the type of the inorganic insulating material particles constituting the barrier layer has no particular limitations, and besides the alumina powder, for example, inorganic oxides such as silicon oxide and zirconium oxide can be used alone, or several types of inorganic oxides can be mixed and used. In addition, it is also possible to use known glass alone, or mix and use several types of known glass. Furthermore, it is also possible to mix and use the inorganic insulating material particles and the glass as described above.

In addition, while the discharge auxiliary electrode film is preferably formed from the material containing, as its main constituents, the metallic particles, the glass covering the metallic particles, and the inorganic oxide in the case of the ESD protection device according to the example of a preferred embodiment of the present invention described above, it is possible for the material to contain a semiconductor powder in place of the inorganic oxide, or in addition to the inorganic oxide.

The addition of the semiconductor powder allows for prevention and suppression of local excessive sintering between the metallic particles constituting the discharge auxiliary electrode film, and allows for prevention and reduction in occurrence frequency of initial short circuit defects.

Furthermore, the addition of the semiconductor powder to the metallic powder allows the clamp voltage characteristics to be improved, as compared with the case of containing only the inorganic oxide. This is assumed to be because the internal conductivity of the discharge auxiliary electrode film with the semiconductor powder added thereto is better than the internal conductivity of the discharge auxiliary electrode film with the inorganic oxide added thereto, due to the resistivity of the semiconductor lower than that of the inorganic oxide. It is to be noted that the clamp voltage refers to a voltage after about 30 ns measured by an oscilloscope, when the same circuit as the circuit used for examining the peak voltage characteristics in Example 1 described above is formed to apply a static electricity of 8 kvolt with the static electricity test gun in contact with the static electricity pulse application section.

It is to be noted that while a good result with a clamp voltage of about 50 volts to about 100 volts was able to be achieved even in the case of containing only the inorganic oxide, it was confirmed that excellent clamp voltage characteristics with a clamp voltage less than about 50 volts are exhibited in the case of containing the semiconductor powder.

Further, when the semiconductor powder is to be contained in the discharge auxiliary electrode film, it is preferable for the discharge auxiliary electrode film to contain the semiconductor powder at a ratio of about 5 volume % to about volume %, for example, relative to the total of the glass-coated metallic particles and the semiconductor powder.

This is because the ratio less than about 5 volume % fails to achieve a sufficient addition effect, and the addition greater than about 50 volume % decreases the ratio of the glass-coated metallic particles in the discharge auxiliary electrode film, decreases the number of junction points between the metallic particles and the semiconductor particles, causes the metallic particles and the semiconductor to fly apart by discharge energy during ESD application, and degrades the repetition peak voltage characteristics.

In addition, it is preferable to select the type of the semiconductor powder in consideration of the reactivity with the glass covering the ceramic base material and the metallic particles, the stability in the firing process, etc.

For example, various materials can be used alone, or several types of materials can be mixed and used, including carbide semiconductors (silicon carbide, zirconium carbide, niobium carbide, titanium carbide, molybdenum carbide, tungsten carbide, etc.), nitride semiconductors (niobium nitride, titanium nitride, zirconium nitride, etc.), boride semiconductors (titanium boride, zirconium boride, niobium boride, molybdenum boride, tungsten boride, lanthanum boride, etc.), silicide semiconductors (titanium silicide, zirconium silicide, tungsten silicide, molybdenum silicide, niobium, etc.), for example.

Furthermore, ferrite may be used as the constituent material of the ceramic base material, in place of such alumina as used in Example 1 or such glass ceramic as used in Example 2.

It is to be noted that while the ESD protection device including the structure with the barrier layer arranged so as to cover the cavity section entirely has been described as an example in Example 2 described above, it is also possible to configure the ESD protection device so that the barrier layer is provided only for a section in which the discharge auxiliary electrode film and the ceramic base material layer will be brought into in direct contact with each other.

The present invention is not to be considered limited to the examples of preferred embodiments described above in terms of other respects, and it is possible to make various applications and various modifications to, within the scope of the present invention, the specific composition of the material constituting the electrode paste for use in the formation of the discharge auxiliary electrode film, the constituents and composition of the discharge auxiliary electrode film itself, the conditions such as the thickness, planar shape, and form of the discharge auxiliary electrode film, the type of the inorganic oxide, the type of the material constituting the protective film, the specific conditions in the steps of manufacturing an ESD protection device according to preferred embodiments of the present invention, etc.

As described above, preferred embodiments of the present invention provide an ESD protection device that significantly lowers the discharge starting voltage and the peak voltage, and undergoes no characteristic degradation even when static electricity is applied repeatedly.

Therefore, it is possible to apply preferred embodiments of the present invention widely in the field of ESD protection devices used for the protection of various appliances and apparatuses including semiconductor apparatuses.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An ESD protection device comprising:

a ceramic base material;

a pair of opposed electrodes including ends opposed to each other at a predetermined distance on a surface of or in the ceramic base material; and a discharge auxiliary electrode film arranged to connect the pair of opposed electrodes; wherein the discharge auxiliary electrode film contains, as its main constituents, metallic particles and glass covering the metallic particles.

2. An ESD protection device comprising:

a pair of opposed electrodes including ends opposed to each other at a predetermined distance on a surface of a ceramic base material; and a discharge auxiliary electrode film arranged to extend continuously so as to cover each of the pair of opposed electrodes partially, and cover a region located at the surface of the ceramic base material and between the pair of opposed electrodes; wherein the discharge auxiliary electrode film contains, as its main constituents, metallic particles and glass covering the metallic particles.

3. An ESD protection device comprising:

a pair of opposed electrodes including ends opposed to each other at a predetermined distance in a ceramic base material; and a discharge auxiliary electrode film provided in the ceramic base material so as to connect the pair of opposed electrodes; wherein a cavity section is provided in the ceramic base material;

the pair of opposed electrodes include a first region located where the ends are opposed to each other and on the ceramic base material facing the cavity section;

the discharge auxiliary electrode film contains, as its main constituents, metallic particles and glass covering the metallic particles, and connects the pair of opposed electrodes, the discharge auxiliary electrode film is arranged to cover at least a second region located between the pair of opposed electrodes and the first region located on the ceramic base material facing the cavity section.

4. The ESD protection device according to claim 1, wherein a barrier layer containing inorganic insulating material particles as its main constituent is provided between the discharge auxiliary electrode film and the ceramic base material.

5. The ESD protection device according to claim 1, wherein the discharge auxiliary electrode film also includes an inorganic oxide at a ratio of about 5 volume % to about 30 volume % relative to a combination of the metallic particles, the glass, and the inorganic oxide.

6. The ESD protection device according to claim 1, wherein the discharge auxiliary electrode film also includes a semiconductor powder at a ratio of about 5 volume % to about 50 volume % relative to a combination of the metallic particles and the semiconductor powder.

7. The ESD protection device according to claim 1, wherein the metallic particles include Cu.

8. The ESD protection device according to claim 1, wherein the opposed electrodes and the discharge auxiliary electrode film are located on the surface of the ceramic base material, and a protective film is provided on the discharge auxiliary electrode film.

9. The ESD protection device according to claim 8, wherein the protective film includes a same type of glass as the glass covering the metallic particles.

10. The ESD protection device according to claim 1, wherein the pair of opposed electrodes are disposed on a common plane so as to be coplanar with one another.

11. The ESD protection device according to claim 2, wherein the pair of opposed electrodes are disposed on a common plane so as to be coplanar with one another.

12. The ESD protection device according to claim 2, wherein a barrier layer containing inorganic insulating material particles as its main constituent is provided between the discharge auxiliary electrode film and the ceramic base material.

13. The ESD protection device according to claim 2, wherein the discharge auxiliary electrode film also includes an inorganic oxide at a ratio of about 5 volume % to about 30 volume % relative to a combination of the metallic particles, the glass, and the inorganic oxide.

14. The ESD protection device according to claim 2, wherein the discharge auxiliary electrode film also includes a semiconductor powder at a ratio of about 5 volume % to about 50 volume % relative to a combination of the metallic particles and the semiconductor powder.

15. The ESD protection device according to claim 2, wherein the opposed electrodes and the discharge auxiliary electrode film are located on the surface of the ceramic base material, and a protective film is provided on the discharge auxiliary electrode film.

16. The ESD protection device according to claim 15, wherein the protective film includes a same type of glass as the glass covering the metallic particles.

17. The ESD protection device according to claim 3, wherein the pair of opposed electrodes are disposed on a common plane so as to be coplanar with one another.

18. The ESD protection device according to claim 3, wherein a barrier layer containing inorganic insulating material particles as its main constituent is provided between the discharge auxiliary electrode film and the ceramic base material.

19. The ESD protection device according to claim 3, wherein the discharge auxiliary electrode film also includes an inorganic oxide at a ratio of about 5 volume % to about 30 volume % relative to a combination of the metallic particles, the glass, and the inorganic oxide.

20. The ESD protection device according to claim 3, wherein the discharge auxiliary electrode film also includes a semiconductor powder at a ratio of about 5 volume % to about 50 volume % relative to a combination of the metallic particles and the semiconductor powder.

* * * * *